United States Patent
McAlpine et al.

(10) Patent No.: US 7,305,493 B2
(45) Date of Patent: Dec. 4, 2007

(54) EMBEDDED TRANSPORT ACCELERATION ARCHITECTURE

(75) Inventors: Gary L. McAlpine, Banks, OR (US); David B. Minturn, Hillsboro, OR (US); Hemal V. Shah, Austin, TX (US); Annie Foong, Aloha, OR (US); Greg J. Regnier, Portland, OR (US); Vikram A. Saletore, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1039 days.

(21) Appl. No.: 10/305,738

(22) Filed: Nov. 27, 2002

(65) Prior Publication Data

US 2004/0103225 A1 May 27, 2004

(51) Int. Cl.
*G06F 15/16* (2006.01)
*G06F 13/00* (2006.01)
*G06F 13/42* (2006.01)
*H04L 12/28* (2006.01)
*G06F 9/46* (2006.01)
*G06F 3/00* (2006.01)
*G06F 13/36* (2006.01)
*H04L 12/56* (2006.01)

(52) U.S. Cl. ............... 709/250; 709/208; 709/232; 709/233; 709/249; 719/311; 710/52; 710/118; 370/395.52

(58) Field of Classification Search ............... 709/200, 709/208, 229, 232, 233, 249, 250; 719/311; 710/52, 105, 118; 370/395.52
See application file for complete search history.

(56) References Cited

U.S. PATENT DOCUMENTS

| | | | | |
|---|---|---|---|---|
| 6,081,848 A | * | 6/2000 | Grun et al. | 710/1 |
| 6,243,778 B1 | * | 6/2001 | Fung et al. | 710/113 |
| 6,321,276 B1 | * | 11/2001 | Forin | 710/3 |
| 6,370,356 B2 | * | 4/2002 | Duplessis et al. | 455/63.3 |
| 6,795,442 B1 | * | 9/2004 | Clayton et al. | 370/395.41 |
| 6,810,442 B1 | * | 10/2004 | Lin et al. | 710/22 |
| 7,076,569 B1 | * | 7/2006 | Bailey et al. | 709/250 |
| 7,089,326 B2 | * | 8/2006 | Boucher et al. | 709/242 |

(Continued)

OTHER PUBLICATIONS

Turner, Yoshio, et al. "Scalable Networking for Next-Generation Computing Platforms," 3rd Annual Workshop on System Area Networks, Feb. 14, 2004, pp. 1-10.*

(Continued)

*Primary Examiner*—Melvin H. Pollack
(74) *Attorney, Agent, or Firm*—Schwegman, Lundberg & Woessner, P.A.

(57) ABSTRACT

An apparatus and a system may include an adaptation module, a plurality of Direct Transport Interfaces (DTIs), a DTI accelerator, and a Transport Control Protocol/Internet Protocol (TCP/IP) accelerator. The adaptation module may provide a translated sockets call from an application program to one of the DTIs, where an included set of memory structures may couple the translated sockets call to the DTI accelerator, which may in turn couple the set of memory structures to the TCP/IP accelerator. An article may include data causing a machine to perform a method including: receiving an application program sockets call at the adaptation module, deriving a translated sockets call from the application program sockets call, receiving the translated sockets call at a DTI, coupling the translated sockets call to a DTI accelerator using a set of memory structures in the DTI, and coupling the set of memory structures to a TCP/IP accelerator.

39 Claims, 9 Drawing Sheets

U.S. PATENT DOCUMENTS

| | | | |
|---|---|---|---|
| 7,142,539 B2* | 11/2006 | Grinfeld | 370/392 |
| 7,149,227 B2* | 12/2006 | Stoler et al. | 370/442 |
| 7,149,817 B2* | 12/2006 | Pettey | 709/250 |
| 7,149,819 B2* | 12/2006 | Pettey | 709/250 |
| 7,164,689 B2* | 1/2007 | Ito et al. | 370/416 |
| 7,167,926 B1* | 1/2007 | Boucher et al. | 709/250 |
| 7,167,927 B2* | 1/2007 | Philbrick et al. | 709/250 |
| 7,181,541 B1* | 2/2007 | Burton et al. | 709/250 |
| 2002/0066033 A1* | 5/2002 | Dobbins et al. | 713/201 |
| 2002/0165899 A1* | 11/2002 | Kagan et al. | 709/104 |
| 2003/0002508 A1* | 1/2003 | Dierks et al. | 370/395.52 |
| 2004/0003126 A1* | 1/2004 | Boucher et al. | 709/250 |
| 2004/0103225 A1* | 5/2004 | McAlpine et al. | 710/52 |
| 2006/0072564 A1* | 4/2006 | Cornett et al. | 370/389 |

OTHER PUBLICATIONS

Regnier, Greg, et al. "TCP Onloading for Data Center Servers," Computer, vol. 37, Issue 11, Nov. 2004, pp. 48-58.*

Banikazemi, M. et al. "VIBe: A Micro-benchmark Suite for Evaluating Virtual Interface Architecture (VIA) Implementations," 15th Intl. Parallel and Distributed Processing Symposium, Apr. 2001, pp. 1-8.*

"International Search Report for corresponding PCT Application No. PCT/US03/37254", (Sep. 8, 2004), 8 pgs.

Buonadonna, P., et al., "Queue Pair IP: A Hybrid Architecture for System Area Networks", *Proceedings of the 29th International Symposium on Computer Architecture (ISCA '02)*, (May 25, 2002), 247-256.

Rangarajan, M., et al., "TCP Servers: Offloading TCP Processing in Internet Servers. Design, Implementation, and Performance", *Rutgers University, Department of Computer Science Technical Report*, http://discolab.rutgers.edu/split-os/dcs-tr-481.pdf, (Mar. 2002), 14 pgs.

Stevens, R. W., *In: UNIX Network Programming*, Prentice Hall, New Jersey, (1990), 209-210.

Correia, Pat, "Developing a Third Generation I/O Specification", *Intel Developer UPDATE Magazine*, Available at http://www.intel.com/update/departments/initech/it03023.pdf, (Mar. 2002), 4 pages.

* cited by examiner

EMBEDDED TRANSPORT ACCELERATION ARCHITECTURE

TECHNICAL FIELD

The present invention relates generally to computer operating systems, interfaces, and communications protocols. More particularly, the present invention relates to apparatus, methods, and computer programs utilizing hardware and software mechanisms to speed up processing of Internet Protocol (IP)-based storage, networking, and inter-processor Input/Output (I/O) operations.

BACKGROUND INFORMATION

The Transmission Control Protocol/Internet Protocol (TCP/IP) suite serves as something of a de facto standard for Internet related communications. The suite enables businesses to merge differing physical networks while giving users access to a common set of services. TCP/IP also provides interoperability between a diversity of networks and other equipment supplied by many different vendors. For more information regarding TCP/IP, see Request For Comment (RFC) 791, "Internet Protocol, Darpa Internet Program Protocol Specification", September 1981, and RFC 793, "Transmission Control Protocol, Darpa Internet Program Protocol Specification", September 1981.

Recently, the communications and computing industries have made significant advances toward integrating storage, networking, and inter-processor I/O using other, similar common technologies and protocols. Thus, the movement toward convergence of many, and possibly all, I/O functions using TCP/IP, is growing. If successfully accomplished, convergence holds great potential for reducing the total cost of building, managing, and maintaining large data centers, as well as the distribution of data, due to the ubiquitous, interoperable, and scalable characteristics of IP related technologies.

TCP/IP was originally designed for relatively low speed networks, at least by current standards, and thus protocol processing was typically performed using software. In addition, TCP/IP has historically only dealt with networked I/O. However, current I/O server bandwidths are roughly three to five orders of magnitude greater than before, and the inclusion of storage and inter-processor I/O adds new challenges that usually cannot be adequately handled by software protocol processing alone. Thus, hardware acceleration of TCP/IP processing becomes desirable in order to support ever-increasing server I/O bandwidths, as well as an end goal of converging server I/O using TCP/IP.

DETAILED DESCRIPTION OF EMBODIMENTS OF THE INVENTION

Figure 1A:
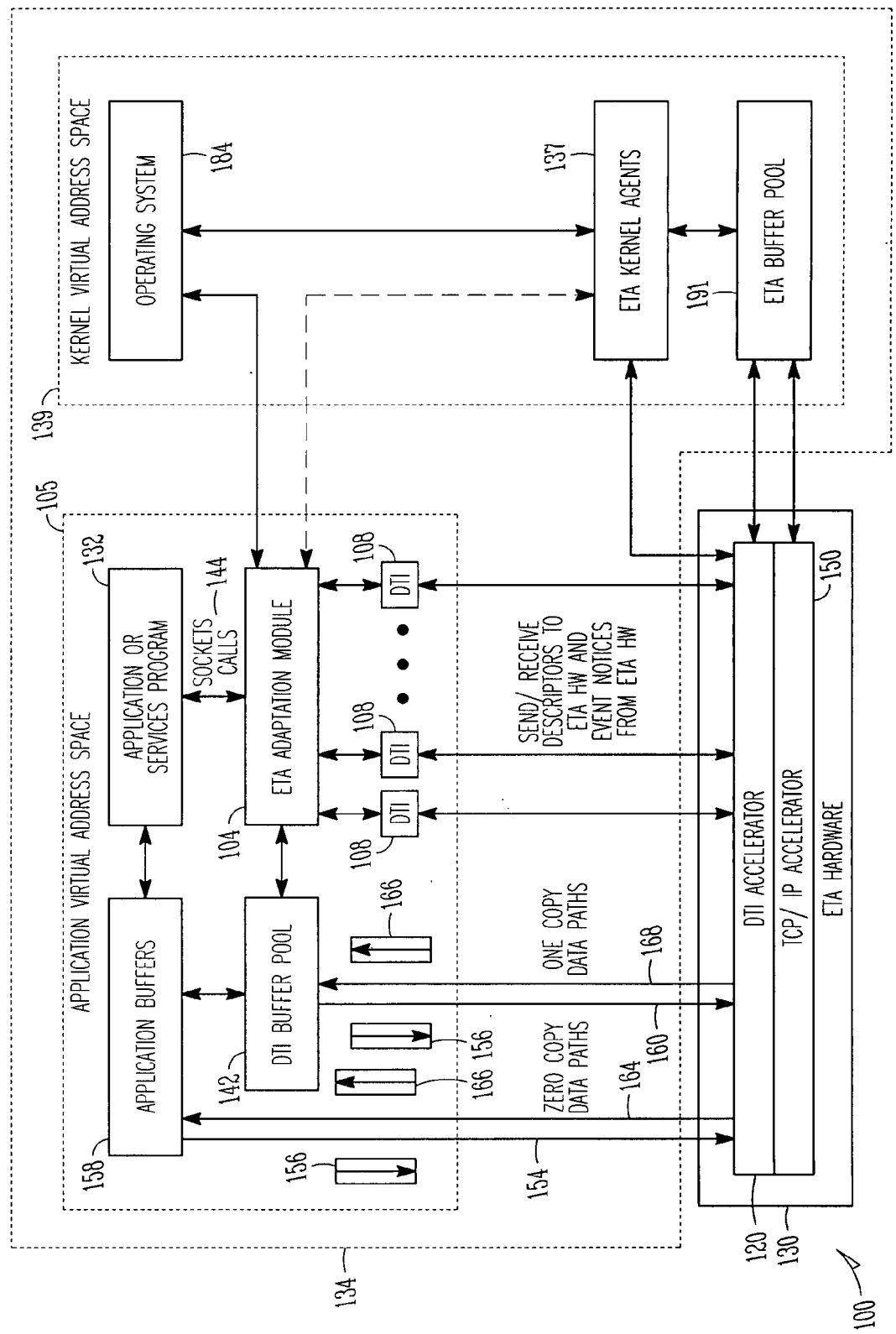
FIGS. 1A, 1B, and 1C are functional block diagrams of several apparatus according to various embodiments of the invention.

In the following detailed description of various embodiments of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

The Embedded Transport Acceleration (ETA) concept espoused by various embodiments of the invention seeks to utilize standard Internet protocols for the majority of server storage, networking, and inter-processor I/O. Thus, some embodiments of the invention may include servers, such as the I/O hubs of high-end system architecture and the Memory-I/O hubs of volume system architecture. However, it should be noted that some embodiments of the invention may be used in other areas, such as in conjunction with the wide spectrum of special purpose appliances and extended function routers that make up the infrastructure of the Internet, as well as the data centers that attach to the Internet. Other uses are also possible, since some embodiments of the invention may assist in offloading TCP/IP related processing, and in reducing additional Operating System (OS) overhead associated with interfacing application and services programs to I/O hardware.

In some embodiments, each application or service level program may open one or more direct transport interfaces (DTIs) with ETA hardware (described below). Then each Application Programming Interface (API) may be implemented as an adaptation layer that translates the API calls into DTI setup, control, and access operations. The ETA Adaptation Layer (ETA-AL) interfaces with the OS, the ETA kernel level agents (described below), and directly with the ETA hardware to perform these operations. Implementation reduces the amount of traffic that cannot be handled directly by the hardware to a level that can be handled by software with little or no noticeable performance impact. In this way, the ETA hardware may provide most of the network and transport layer processing, while applications and hardware exchange data directly through DTIs (eliminating the requirement of processing those steps in software, primarily the OS stack).

Many options are available for ETA implementation. For example, specialized microcoded engines (essentially programmable state machines) can be added to Memory-I/O hubs, including the design of a specialized engine that is integrated into the host operating environment and offloads a large percentage of the protocol and I/O processing. Alternatively, embedded I/O processor cores may be added to Memory-I/O hubs. Further, ETA functionality may be added to processors using hardware and software program modules, including the use of co-processing functions embedded in processors. Finally, one or more of a server's main processors can be dedicated for use as an ETA network co-processor.

Application or service programs may run in user space or in kernel space. The ETA concept supports low overhead I/O for programs running in either space since application and service level software can interact directly with ETA hardware to control data transfers (reducing OS overhead, kernel transitions, and interrupt processing). For example, zero-copy transfers can be performed directly to/from pre-pinned application buffers (eliminating copies between Network Interface Card (NIC) buffers and stream buffers, and between stream buffers and application buffers).

At the highest level, an ETA-based host may include a set of ETA hardware integrated into a chipset that interfaces with the host processor, host memory, and host software. The host interfaces between the hardware and software should be optimized for supporting and presenting the standard Sockets API to applications and services with underlying TCP and User Datagram Protocol (UDP) transport semantics. For more information on the UDP, see RFC 768, "User Datagram Protocol", Information Sciences Institute, August 1980.

The ETA-AL adapts Sockets interfaces to the ETA Hardware. The purpose of the ETA-AL is to facilitate both the Sockets providers and interface libraries by providing application interfaces, adaptation functionality (sockets and interfaces), ETA hardware primitives, anonymous buffering control, and ETA event handling facilities.

The ETA-AL receives standard Sockets calls and masks the ETA architecture from the application or service level software, which allows existing applications to utilize various embodiments of the invention without modification. Thus, legacy applications written according to the original Berkley Sockets programming interface allow the transport and network layers of the networking stack to be offloaded from the host CPU. For more information on the Berkeley Sockets programming interface, please see "An Introductory 4.3BSD Interprocess Communication Tutorial", by Stuart Sechrest and "An Advanced 4.3BSD Interprocess Communication Tutorial", by Samuel J. Leffler et al., both in the Unix Programmers's Manual, Supplementary Documents 1 (sections PS1:7 and PS1:8), The University of California, June 1993. Newer applications written using asynchronous I/O should also be able to take advantage of the features of various embodiments of the invention to reap performance gains by avoiding data copies and allowing for split transaction processing.

Embodiments of the invention also include an ETA Kernel Agent module (ETA-KA) which provides the kernel level driver for the ETA hardware and various other ETA support functions. The ETA-KA supports the setup and management of the ETA hardware, as well as data structures shared by the hardware and software. However, the ETA-KA does not typically operate as part of the main data flow between the ETA hardware and the application or service level software. A raw packet driver may be used to provide a default data path to/from the OS stack for initial communication and some control traffic during system boot. Thus, until DTIs are established by applications or service level programs, all traffic may flow through the default data path, the raw packet driver, and the OS stack. However, once a DTI has been established, the data traffic and flow control for that DTI can be handled directly between the hardware and application level software through an ETA-AL.

All global resources, such as DTIs, memory buffers, and ETA hardware table resources may be managed by the ETA-KA. The ETA-KA provides system call interfaces that the ETA-AL uses to allocate and free these resources.

Thus, DTIs may be created and destroyed dynamically by the ETA-AL as needed to provide direct data transfer paths. If connections cannot be routed through DTIs because of low or non-existent ETA resources, the default path through the OS and the raw packet driver may be used.

The ETA-KA may also be responsible for servicing interrupts generated by the ETA hardware. ETA interrupts may be used to signal both global events and DTI events. Global events pertain to some shared resource within the ETA, including hardware errors, memory pool management, and transport exceptions. DTI events may be localized to a specific DTI, and can be proxied by the ETA-KA for the associated ETA-AL. The ETA-KA also handles DTI events and provides event notifications to the ETA-AL.

In addition, the ETA-KA may be responsible for managing the ETA network stack on behalf of the Operating System Vendor (OSV) network stack. Network stack management entry points, or call-back functions, are provided per OSV specifications. The ETA-KA services OSV stack management call-back functions and may translate them into operations performed on the ETA network stack, such as IP address assignments, IP route and table updates, and TCP connection migration.

It should be noted that the ETA-AL may include direct interfaces to the ETA-HW through DTI doorbell and queue facilities, which are used to communicate with the DTI hardware by posting descriptors to send and receive queues, signaling ETA-HW through doorbells, and receiving event notifications from ETA-HW through completion queues. Thus, the ETA-AL can interface directly with ETA-HW in order to establish connections, send and receive data, and synchronize events. The interfaces between the ETA-AL, ETA hardware, and ETA-KA may be effected via software primitive functions.

Figure 1B:
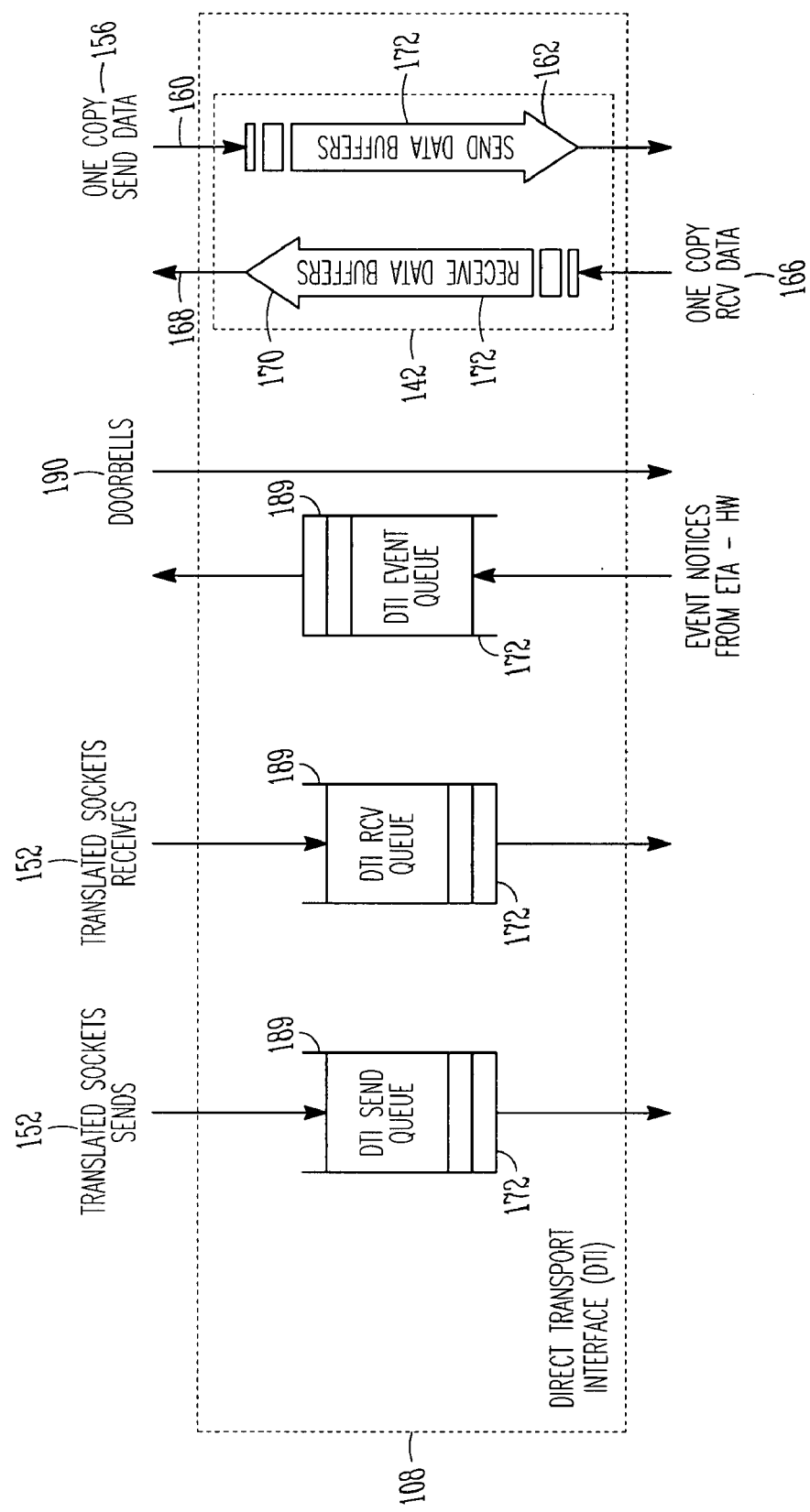
Figure 1C:
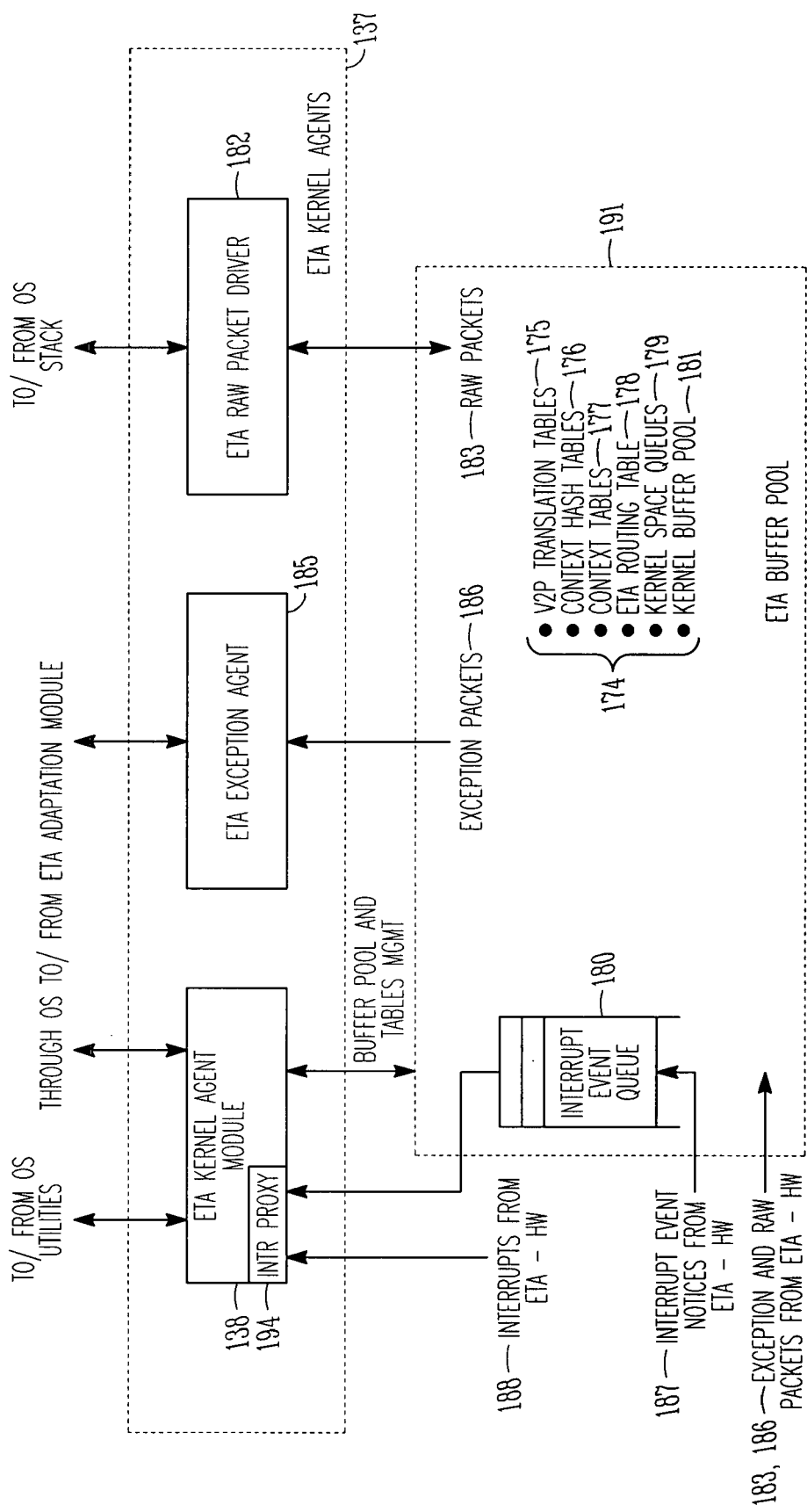

FIGS. 1A, 1B, and 1C are functional block diagrams of several apparatus according to various embodiments of the invention. For example, turning to FIG. 1A and considering the foregoing description, an apparatus 100 according to one embodiment of the invention may include an adaptation module (e.g, the ETA-AL) 104, perhaps included in an application virtual address space 105, a plurality of direct transport interfaces (DTIs) 108, and a DTI accelerator 120 (forming part of the ETA hardware 130). While a single application or service level program 132 with multiple DTIs 108 is shown, it should be noted that some embodiments of the invention support many application programs 132, each utilizing multiple APIs and many DTIs 108 simultaneously.

In some embodiments of the invention, host memory 134 address space may be allocated to each of the major processing elements, including one or more application or services programs 132, the adaptation module 104, the ETA hardware 130, and ETA kernel level software agents 137, such as the ETA-KA 138 (see FIG. 1C), which may be located in kernel virtual address space 139. If the application or service program 132 runs in user space, the application buffers 158 and DTI buffer pool 142 may also be allocated in user space. However, the buffers 142, 158 may also reside in kernel space 139. The DTI buffer pool 142 may be managed by the adaptation module 104, enabling dynamic creation and destruction of each one of the plurality of DTIs 108. Further details of the DTI's 108, including the DTI buffer pool 142, can be seen in FIG. 1B.

Considering various embodiments of the invention, there are several ways in which application programs 132 can communicate. For example, the application program 132 is capable of communicating sockets calls 144 directly with the TCP/IP accelerator 150 (which may form part of the ETA hardware 130) using DTI descriptors 152. The socket calls 144 are translated to DTI descriptors 152 by the adaptation module 104 (e.g., by the ETA-AL). Thus, the apparatus 100 may include a zero-copy send data path 154 capable of transferring send data 156 directly from an application buffer 158 associated with the application program 132 to the TCP/IP accelerator 150. Alternatively, for indirect communications, the apparatus 100 may include a one-copy send data path 160 capable of transferring send data 156 through a DTI send buffer 162 (see FIG. 1B) to the TCP/IP accelerator 150. Similarly, the apparatus 100 may include a zero-copy receive data path 164 capable of transferring receive data 166 directly from the TCP/IP accelerator 150 to an application buffer 158 associated with the application program 132. Again, in the alternative, the apparatus 100 may include a one-copy receive data path 168 capable of transferring the receive data 166 through a DTI receive buffer 170 to the application buffer 158.

Thus, the apparatus may also include a DTI buffer pool 142 managed by the adaptation module 104, to enable dynamic creation, allocation, and destruction of the set of memory structures 172 included in each one of the DTIs 108.

Further, the apparatus 100 may include a kernel agent (e.g., the ETA-KA) 138 to initialize and/or manage the ETA hardware 130, including the DTI accelerator 120 and the TCP/IP accelerator 150. The kernel agent 138 may include a set of control tables 174, including an address translation table 175, a context hash table 176, a context table 177, a routing table 178, a set of kernel space queues 179, a plurality of interrupt event queues 180, and a kernel buffer pool 181. The control tables 174 may be shared by the kernel agent 138, the DTI accelerator 120, and the TCP/IP accelerator 150. The apparatus 100 may also include a raw packet driver 182 to provide a default packet communication path 183 between the DTI accelerator 120 and an OS 184, as well as an exception agent 185 to process packets 186 not processed by the TCP/IP accelerator 150 or the OS 184. Further details regarding the ETA kernel agents 137, can be found in FIG. 1C.

To handle interrupts, the apparatus 100, including the ETA-KA 138, may include an interrupt proxy 194 to receive an interrupt 188 (associated with the adaptation module 104) from the DTI accelerator 120. The interrupt proxy 194, in turn, may relay interrupt event notices 187 to the adaptation module 104 to enable interrupt processing.

Therefore, it can be seen that the set of memory structures 172 included in each one of the DTIs 108 is capable of coupling the translated sockets call 152 to the DTI accelerator 120. The DTI accelerator 120, in turn, is capable of coupling the set of memory structures 172 to the TCP/IP accelerator 150 (each forming a part of the ETA hardware 130).

The application buffer space may include buffers 158 used by the application or services programs 132 for I/O. To support the zero-copy path 154,164, these buffers 158 can be registered prior to posting send or receive operations for the ETA hardware 130. Registering memory pins the address space and sets up address translation tables 175 for the ETA hardware 130.

Since Sockets semantics do not require pinning or registering application buffers 158 prior to specifying them in "send" or "receive" calls, the buffers 158 may be registered by the adaptation module 104 at the time a call is made. To reduce the resulting overhead (which may be relatively high), ETA-aware applications 132 can pre-register the buffers 158 they use for communications through DTIs 108.

The DTI buffer pool 142 may be allocated, registered, and managed by the adaptation module 104. The primary use of this space is for DTI queues 189 and for DTI send and receive buffers 162, 170. The DTI send and receive buffers 162, 170 may be used for buffering received segments when no receives are pre-posted, when segments are received out of order, or for buffering data segments to/from unregistered memory.

The ETA-KA 138 can also be called to allocate memory mapped I/O address space for DTI doorbells 190. The doorbell space enables the adaptation module 104 running in user space to write notifications directly to the ETA hardware 130. The ETA-AL or adaptation module 104 is thus capable of providing a translated sockets call 152 associated with the application program 132 to one or more selected DTIs 108.

The ETA buffer pool 191 (shown in more detail in FIG. 1C) may be allocated, registered, and managed by the ETA-KA 138. The ETA buffer pool 191 is used primarily as a container for the control tables 174, such as address translation tables 175, context hash tables 176, context tables 177, ETA routing tables 178, kernel space queues 179, kernel buffer pools 181, and other tables, buffers, and queues.

In summary, several modules may be involved in performing communications through the ETA hardware 130, which may include a DTI accelerator 120 and a TCP/IP accelerator 150. These modules include, but are not limited to, an ETA adaptation module 104, one or more application or service programs 132, an ETA-KA 138, a raw packet driver 182, an OS 184 (coupled to the adaptation module 104), and an ETA Exception Agent (ETA-EA) 185.

The application or service program 132 may run in either user or kernel space and utilizes embodiments of the invention to perform the operations required by its API calls. The adaptation module or ETA-AL 104 may perform interfacing tasks through calls to the OS 184, ETA-KA 138, and/or the ETA hardware 130. The adaptation module 104 calls the OS 184 and the ETA-KA 138 to perform setup and management tasks, and calls the ETA hardware 130 (through DTIs 108) to control the transfer of data, for example send and receive data 156, 166.

The ETA-KA 138 provides a hardware driver, interrupt proxy 194, and a set of utilities to support the setup and management of DTIs 108 and shared data structures, including control tables 174, on behalf of various adaptation module functions. The basic functions these utilities perform on behalf of the adaptation module 104 include creating and destroying DTI structures 108, establishing connections, assigning doorbell 190 space to DTIs 108, registering memory buffers 158 with the apparatus 100, proxy handling of interrupts 188 on behalf of blocked application threads, maintaining coherency between system tables and an ETA routing table 178, maintaining a hash table 176, a context table 177, virtual to physical address translation tables 175, and interfacing with the ETA hardware 130 for control and management functions.

The raw packet driver 182 supports the ETA raw packet (default) path 183 through the ETA hardware 130 and the OS 184. The ETA-EA 185 handles exception packets 186 and ETA network stack exception events on behalf of the ETA hardware 130. Thus, the primary function of the ETA-EA 185 is to provide a location where the ETA hardware 130 can offload specific operations.

Figure 2:
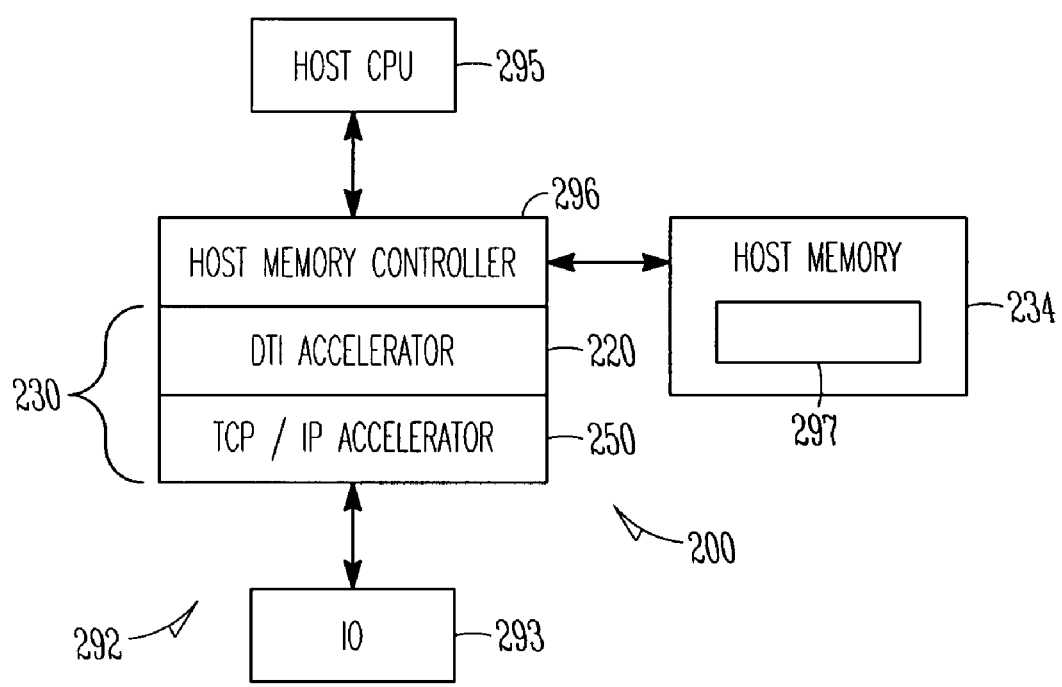
FIG. 2 is a functional block diagram of an article and various systems according to several embodiments of the invention.

FIG. 2 is a functional block diagram of an article and a system according to various embodiments of the invention. Servers and other platforms may include many types of I/O connections. For example, I/O ports conforming to the Peripheral Component Interconnect (PCI) Express™ specification may be used. For more information on the PCI Express™ specification, see "Developing a Third Generation I/O Specification" by Pat Correia, Intel® Developer Update Magazine, March 2002. Memory-I/O and I/O hub devices may have multiple ports used for interconnecting a complex of I/O devices with a host memory and one or more processors. For example, some embodiments of the invention include a single ETA hardware block (see element 130 in FIG. 1) handling the combined I/O traffic of multiple Medium Access Control (MAC) level devices, including those whose operations conform to the Ethernet standard. MAC is a common term used for the link side interface between the network layer and the link layer as part of a network architecture. However, MAC is also commonly used to denote the hardware that implements the link layer (sometimes including the physical layer). For more information regarding the Ethernet standard, please see IEEE 802.3, 2000 Edition, IEEE Standard for Information Technology—Telecommunications and information exchange between systems—local and metropolitan area networks—specific requirements—Part 3: Carrier Sense Multiple Access with Collision Detection Access Method and Physical Layer Specifications. MAC level devices may be interfaced to the ETA hardware block through direct links to the Memory-I/O hubs or through switch devices.

For example, as shown in FIG. 2, a system 292 according to an embodiment of the invention may include any of the apparatus 200 described above, including an adaptation module, a plurality of direct transport interfaces (DTIs), and a DTI accelerator 220, perhaps operating in a host memory space 234. The system 292 also may include a general purpose input/output interconnect interface 293, such as a PCI Express™ interface, capable of being communicatively coupled to the apparatus 200.

Thus, a system 292 according to an alternative embodiment of the invention may include a DTI buffer pool managed by an adaptation module, wherein the DTI buffer pool enables dynamic creation and destruction of each one of the plurality of DTIs. In another embodiment, a system 292 may include a kernel agent (e.g., an ETA-KA) to manage a DTI accelerator 220 and a TCP/IP accelerator 250. In yet another embodiment, a system 292 may include a kernel agent having an address translation table, a context hash table, a context table, a routing table, a set of kernel space queues, a plurality of interrupt event queues, and a kernel buffer pool.

Thus, FIG. 2 illustrates one of many ways some embodiments of the invention may be integrated within Memory-I/O or I/O hub devices. The ETA hardware block 230 provides a path for I/O parallel to the logic used for bridging the normal load/store I/O and DMA traffic into and out of the host. A peer-to-peer packet passing protocol may be used to communicate with MAC level devices using PCI Express™ interfaces.

Future MAC level devices may be designed specifically for use in chipsets that include embodiments of the invention and PCI Express™ interfaces. Included in this concept, for example, is the notion of a host and multiple MAC level devices, interconnected according to the PCI Express™ specification, providing Ethernet functionality.

With respect to FIGS. 1 and 2, it should be noted that apparatus 100, 200, adaptation module (e.g., the ETA-AL) 104, DTIs 108, DTI accelerator 120, 220, the ETA hardware 130, 230, application or service level programs 132, host memory 134, 234, kernel agent (e.g., ETA-KA 138), application buffers 158, DTI buffer pool 142, TCP/IP accelerator 150, 250, zero-copy send data path 154, one-copy send data path 160, DTI send buffer 162, zero-copy receive data path 164, one-copy receive data path 168, DTI receive buffer 170, memory structures 172, control tables 174, address translation table 175, context hash table 176, context table 177, routing table 178, kernel space queues 179, interrupt event queues 180, kernel buffer pool 181, raw packet driver 182, default communication path 183, operating system 184, ETA-EA 185, interrupt event notices 187, interrupts 188, DTI queues 189, DTI doorbells 190, ETA buffer pool 191, interrupt proxy 194, system 292, and the general purpose input/output interconnect interface 293 may all be characterized as "modules" herein. Such modules may include, or communicate with, hardware circuitry, such as one or more processors and/or memory circuits, software program instructions, firmware, electrical signals, and/or combinations thereof, as desired by the architect of the apparatus 100, 200, and system 292, and as appropriate for particular implementations of various embodiments of the invention. All of the modules may reside in a single memory or computer, or each module may be distributed among multiple processors and/or computers, or some combination of concentration and distribution may be effected, so as to group various modules in selected locations, again, as may be appropriate for particular implementations of various embodiments of the invention.

One of ordinary skill in the art will understand that the apparatus described herein can be used in applications other than with systems that include networked servers or devices, and thus various embodiments of the invention are not to be so limited. The illustrations of an apparatus 100, 200, and system 292 are intended to provide a general understanding of the structure of various embodiments of the present invention, and they are not intended to serve as a complete description of all the elements and features of apparatus and systems that might make use of the structures described herein.

Applications which may include the novel apparatus and systems described herein include electronic circuitry used in high-speed computers, communications and signal processing circuitry, processor modules, embedded processors, and application-specific modules, including multilayer, multichip modules. Such apparatus and systems may further be included as sub-components within a variety of electronic systems, such as televisions, cellular telephones, personal computers, radios, vehicles, and others.

Figure 3:
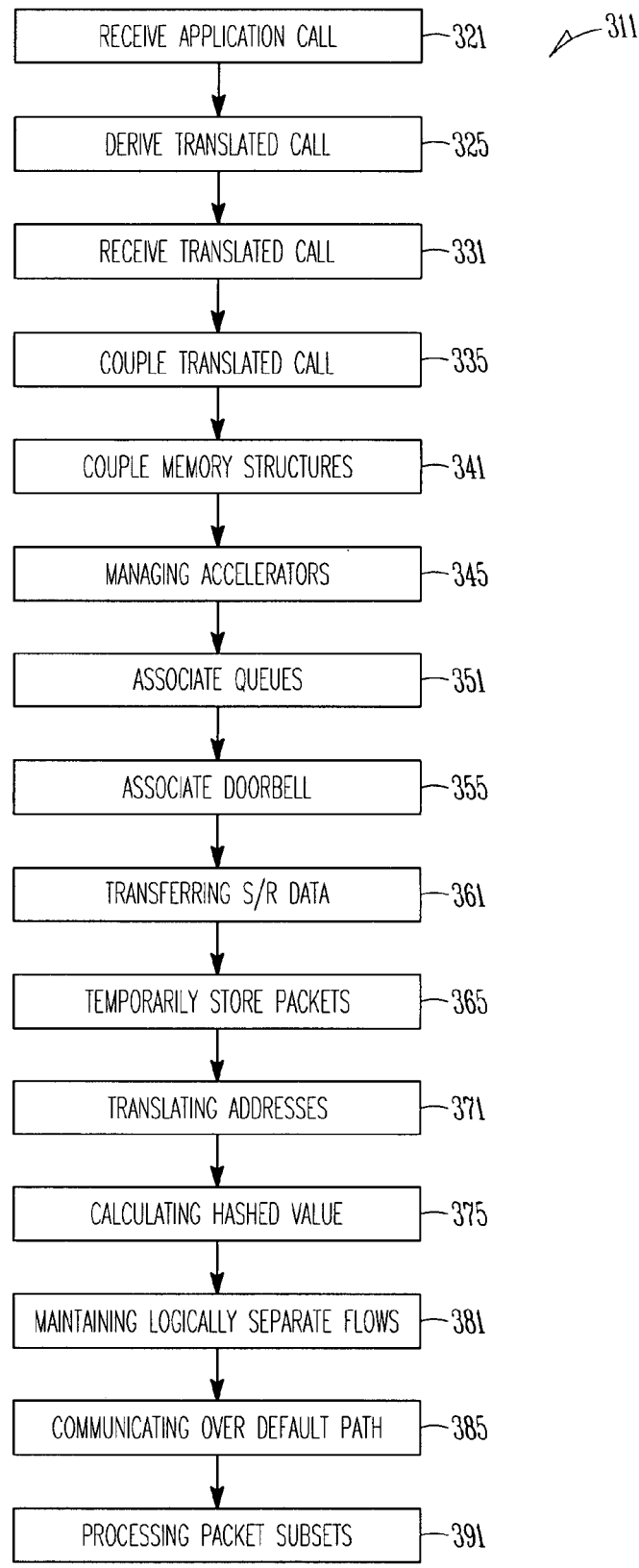
FIG. 3 is a partial listing of exemplary transport acceleration methods according to various embodiments of the invention.

FIG. 3 is a partial listing of exemplary transport acceleration methods according to various embodiments of the invention. For example, a method 311 according to one embodiment of the invention may begin with receiving an application sockets call from an application program at an adaptation module at block 321, deriving a translated sockets call from the application sockets call at block 325, receiving the translated sockets call at a DTI having a set of memory structures at block 331, coupling the translated sockets call to a DTI accelerator using the set of memory structures at block 335, and coupling the set of memory structures to a TCP/IP accelerator at block 341. In addition, as mentioned above, the method may include managing the DTI accelerator and the TCP/IP accelerator using a kernel agent buffer pool at block 345.

The method may also include associating a send queue and a receive queue with the DTI to enable posting send and receive descriptors, respectively, at block 351. Another possible activity includes associating an event queue with the DTI to enable posting event notices from the DTI accelerator to an adaptation module at block 351. In addition, the method may include associating a doorbell address with the DTI to enable posting event notices from the adaptation module to the DTI accelerator at block 355.

Data may be transferred in many different ways. For example, the method may include transferring send data directly from an application buffer associated with the application program to the TCP/IP accelerator, as well as transferring send data indirectly from an application buffer associated with the application program to the TCP/IP accelerator through a send buffer associated with the DTI at block 361. Similarly, the method may include transferring receive data directly from the TCP/IP accelerator to an application buffer associated with the application program, as well as transferring receive data indirectly through a receive buffer associated with the DTI to an application buffer associated with the application program at block 361.

Temporary storage is also included in some embodiments of the invention. For example, the method may include temporarily storing a plurality of packets received out-of-order in the receive buffer associated with the DTI, as well as temporarily storing a plurality of packets received when no sockets receive call is pending in the receive buffer associated with the DTI at block 365.

Address translation may also form part of the method. For example, the method may include translating a virtual address included in the translated sockets call into at least one physical address to access a memory structure included in a virtual memory space associated with the application program using a translation table included in the kernel agent buffer pool at block 371. Additionally, the method may include translating IP addresses and TCP port numbers received in a network packet into a pointer to a DTI context stored in a context table in the kernel agent buffer pool at block 371. Further, the method may include translating a destination IP address of a packet being sent to a network into a local subnet address using a routing table stored in the kernel agent buffer pool at block 371.

Other address-related tasks may include calculating a hashed value from IP addresses and TCP port numbers received in a network packet and using the result as an index into a context hash table in order to fetch from the context hash table a pointer into the context table stored in the kernel agent buffer pool at block 375.

The method may also include maintaining a set of logically separate control and transfer flows for a plurality of DTIs using a context table included in a kernel agent buffer pool at block 381. The method may also include communicating over a default communication path between an operating system and the DTI accelerator using a raw packet driver at block 385, and processing one or more packets (i.e., a subset of packets) included in a plurality of packets not processed by the operating system or the TCP/IP accelerator using an exception agent at block 391.

To illustrate a few of the many other embodiments included in the invention, several exemplary methods are hereafter described. It should be noted that, while certain tasks are illustrated as being carried out by the adaptation module, DTI accelerator, and/or TCP/IP accelerator, such assignments are not necessarily required, and other implementations and variations are possible.

Figure 4:
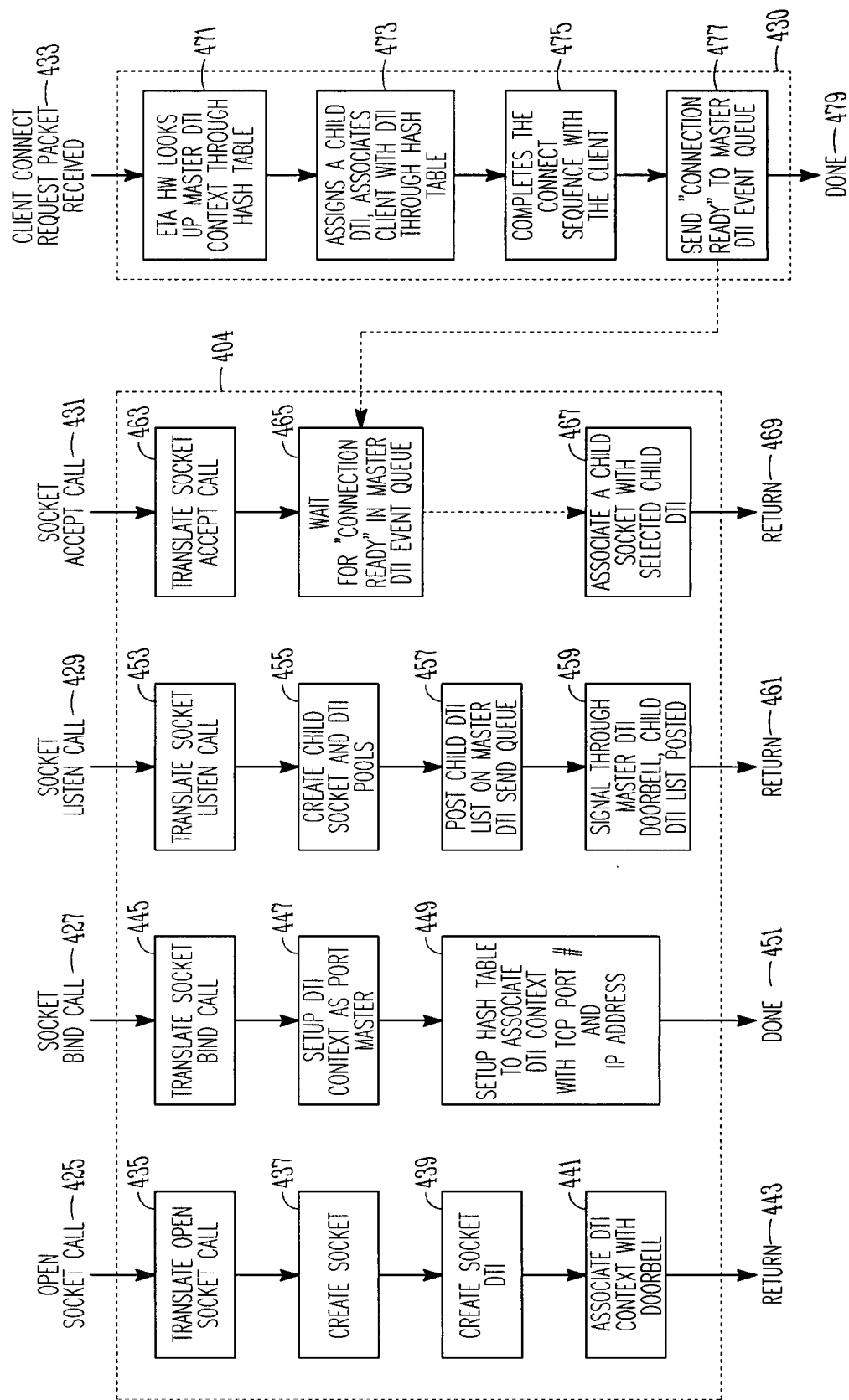
FIG. 4 is a flow diagram of exemplary methods that may be used to initialize sockets operations according to various embodiments of the invention.

FIG. 4 is a flow diagram of exemplary methods that may be used to initialize sockets operations according to various embodiments of the invention. The adaptation module 404 and ETA hardware 430, including the DTI and TCP/IP accelerators, are shown to indicate which operations might be assigned to each of the modules. The operations, including responses to an Open Socket call at block 425, a Socket Bind call at block 427, a Socket Listen call at block 429, a Socket Accept call at block 431, and handling reception of a Client Connect Request packet at block 433 are implicated as actions which may be used to set up a Master TCP listen port and a corresponding Master DTI for that port. Also included are the actions of spawning and connecting a Child DTI for a new Client TCP Connection Request.

These actions may be summarized as: receiving a connection request from a client, associating the connection request with a master DTI (may include calculating an index into a hash table), acquiring a child DTI from the master DTI (may be accomplished through a master DTI queue), associating the child DTI with the connection request (may include calculating an index into a hash table), completing a connection sequence to provide an established connection associated with the connection request, and notifying an ETA adaptation module of the established connection. These actions may also include sending a first connection acknowledgment to the client, waiting for a second connection acknowledgment from the client, and writing a connection ready notification to a master DTI event queue.

Thus, a method of handling an Open Socket call may include translating the Open Socket call at block 435, creating a socket at block 437, creating a socket DTI at block 439, and associating a DTI context with a doorbell at block 441. The method may then conclude by returning at block 443.

A method of handling a Socket Bind call may include translating the Socket Bind call at block 445, establishing the DTI context as the TCP port master at block 447, and creating a hash table to associate the DTI context with the TCP port number and IP address at block 449. The method may then conclude by returning at block 451.

A method of handling a Socket Listen call may include translating the Socket Listen call at block 453, creating a pool of Child sockets and a pool of child DTIs at block 455, posting the Child DTI list on the Master DTI send queue at block 457, and signaling, via the Master DTI doorbell, that the Child DTI list is posted at block 459. The method may then conclude by returning at block 461.

A method of handling a Socket Accept call may include translating the Socket Accept call at block 463, waiting for an indication that the connection is ready in the Master DTI event queue at block 465, and associating a Child socket with the selected Child DTI at block 467. The method may then conclude by returning at block 469.

A method of handling the reception of a Client Connect Request packet may include locating (i.e., looking up) the Master DTI context using the hash table, typically using the ETA hardware, at block 471, assigning a Child DTI and associating the client with the Child DTI using the hash table at block 473, completing the connection sequence with the client at block 475, and sending an indication that the connection is ready to the Master DTI event queue at block 477, enabling the Socket Accept to resume at block 465. The method may then conclude by waiting for the next Client Connect Request at block 479, and then resuming at block 471, as described above.

Figure 5:
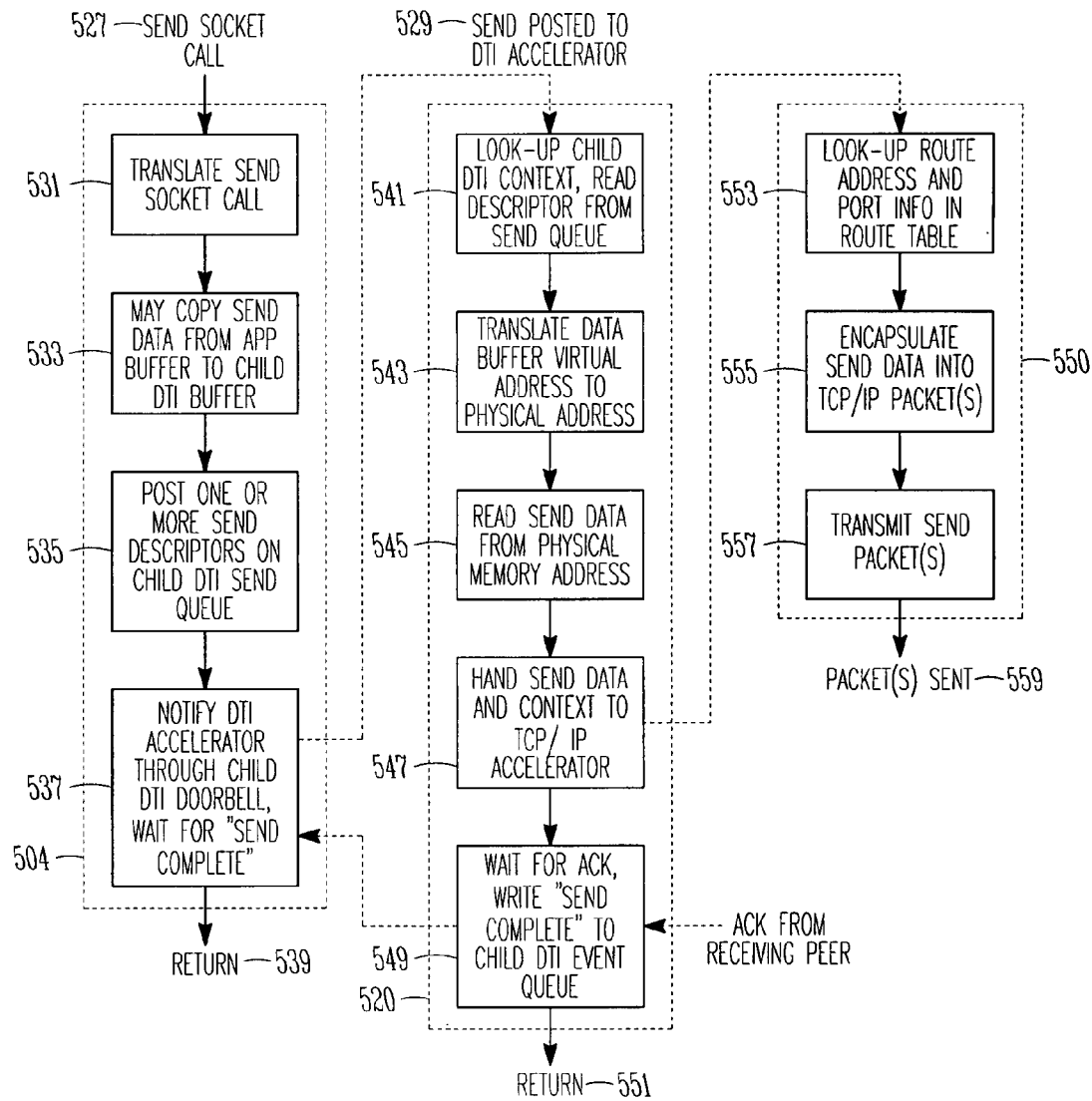
FIG. 5 is a flow diagram of an exemplary sockets send method according to an embodiment of the invention.

FIG. 5 is a flow diagram of an exemplary sockets send method according to an embodiment of the invention. The adaptation module 504 and ETA hardware, including the DTI and TCP/IP accelerators 520, 550, are shown to indicate which operations might be assigned to each of the modules. The operations include a response to a Send Socket call at block 527 and handling a send posted to the DTI accelerator at block 529.

Thus, a method of handling a Send Socket call may include translating the Send Socket call at block 531, copying send data from an application buffer to a Child DTI buffer at block 533 (if required), posting one or more send descriptors on the Child DTI send queue at block 535, and notifying the DTI accelerator through a child DTI doorbell, as well as waiting for an indication that the send is complete, at block 537. The method may then conclude by returning at block 539. Each socket send may be executed as a separate thread of the adaptation module 504, and many socket send threads may be executed in parallel in an interleaved manner.

The method may also continue with the DTI Accelerator locating (i.e., looking up) the Child DTI context and reading a descriptor from the send queue at block 541, translating the data buffer virtual address to a physical address at block 543, reading send data from the translated physical address at block 545, transmitting the send data and context to the TCP/IP accelerator at block 547, and waiting for an acknowledge (e.g., "ACK" signal) from the Receiving Peer and writing an indication that the send is complete to the Child DTI event queue at block 549, enabling the Send Socket call to resume at block 537. The method may then conclude by waiting at block 551 for the next send doorbell and then resuming at block 541. The method may also continue as described above. Each send may be executed as a separate thread on the DTI accelerator 520, and many send threads may be executed in parallel, in an interleaved manner.

When the send data and context are handed to the TCP/IP accelerator at block 547, the method continues with locating (i.e., looking up) routing address and port information in a routing table at block 553, encapsulating the send data within one or more TCP/IP packets at block 555, and then transmitting the send packets at block 557. The method may then wait at block 559 for the next Send and then resume at block 529.

Figure 6:
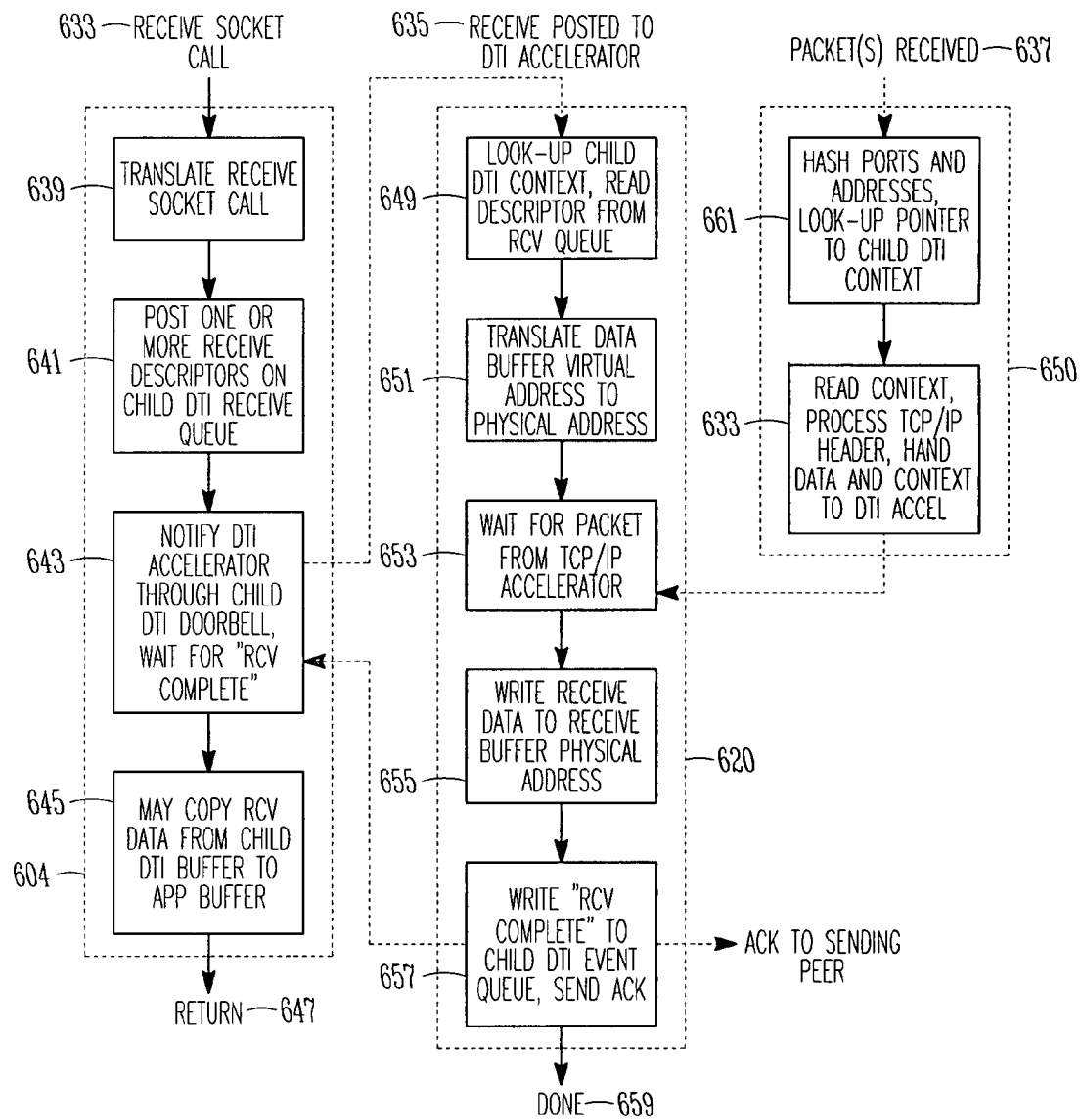
FIG. 6 is a flow diagram of an exemplary sockets receive method according to an embodiment of the invention.

FIG. 6 is a flow diagram of an exemplary sockets receive method according to an embodiment of the invention. The adaptation module 604 and ETA hardware, including the DTI and TCP/IP accelerators 620, 650, are shown to indicate which operations might be assigned to each of the modules. The operations include a response to a Receive Socket call at block 633, handling a receive posted to the DTI accelerator at block 635, as well as those which may occur when packets are received at block 637.

Thus, a method of handling a Receive Socket call may include translating the Receive Socket call at block 639, posting one or more receive descriptors on the Child DTI receive queue at block 641, notifying the DTI accelerator through a child DTI doorbell, as well as waiting for an indication that the send is complete, at block 643, and copying receive data from the child DTI buffer to an application buffer at block 645 (if required). The method may then conclude by returning at block 647. Each socket receive may be executed as a separate thread of the adaptation module 504, and many socket receive threads may be executed in parallel in an interleaved manner.

The method may also continue from block 643 with locating (i.e., looking up) the Child DTI context and reading a descriptor from the receive queue at block 649, translating a data buffer virtual address to a physical address at block 651, waiting for a packet from the TCP/IP accelerator at block 653, writing receive data to the receive buffer physical address at block 655, writing an indication that the receive is complete to the Child DTI event queue at block 657, enabling block 643 to resume, and then sending an acknowledge indication (e.g., "ACK" signal) to the Sending Peer. The method may then conclude by waiting at block 659 for the next receive to be posted, and then resume at block 635. The method may also continue at block 653 if another packet is received. Each receive may be executed as a separate thread on the DTI accelerator 520, and many receive threads may be executed in parallel, in an interleaved manner.

When packets are received, the method may include hashing the TCP ports and IP addresses, as well as locating (i.e., looking up) a pointer to the Child DTI context at block 661, and reading the Child DTI context, processing the TCP/IP header, and transmitting the receive data and context to the DTI accelerator at block 663. The method may then wait at block 637 for the next packet received.

Figure 7:
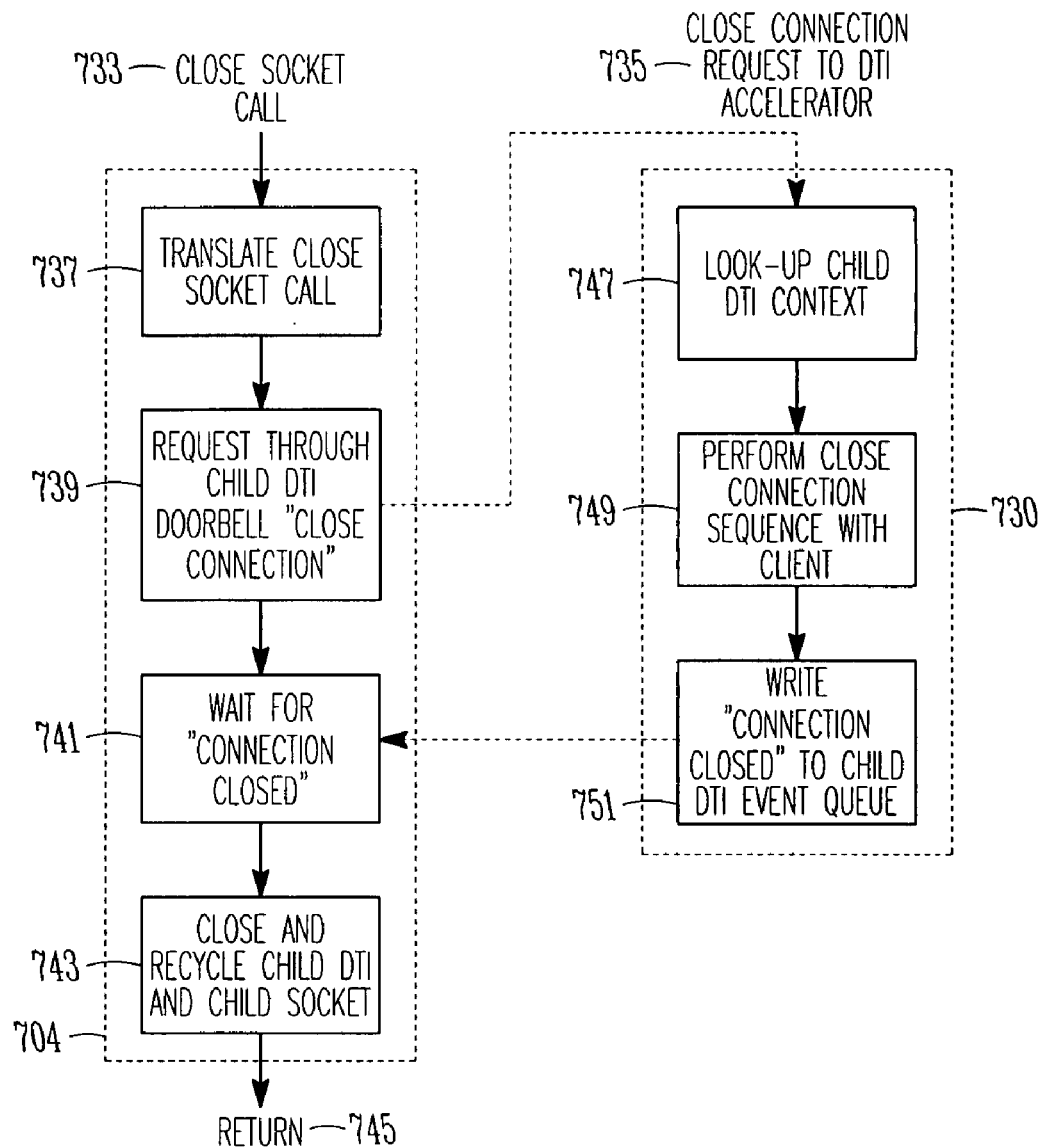
FIG. 7 is a flow diagram of an exemplary method for closing a connection according to an embodiment of the invention.

FIG. 7 is a flow diagram of an exemplary method for closing a connection according to an embodiment of the invention. The adaptation module 704 and ETA hardware 730, including the DTI and TCP/IP accelerators, are shown to indicate which operations might be assigned to each of the modules. The operations include a response to a Close Socket call at block 733 and handling a close connection request to the DTI accelerator at block 735.

Thus, a method of handling a Close Socket call may include translating the Send Socket call at block 737, requesting that the connection be closed using a Child DTI doorbell at block 739, waiting for the connection to be closed at block 741, and closing and recycling the Child DTI and Child socket at block 743. The method may then conclude by returning at block 745.

The method may continue with locating (i.e., looking up) the Child DTI context at block 747, performing a close connection sequence with the client at block 749, and then writing an indication that the connection is closed to the Child DTI event queue at block 751, enabling block 741 to resume.

It should be noted that while buffers, queues, interrupts, and doorbells have been used as exemplary representational mechanisms herein, other representational mechanisms may also be used according to the apparatus, systems, and methods disclosed herein, and therefore various embodiments of the invention are not to be so limited. Therefore, it should be clear that some embodiments of the invention may also be described in the context of computer-executable instructions, such as program modules, being executed by a computer. Generally, program modules may include routines, programs, objects, components, data structures, etc. that perform particular tasks or implement particular abstract data types. As such, any of the modules 100, 104, 108, 120, 130, 132, 134, 138, 140, 142, 150, 154, 158, 160, 162, 164, 168, 170, 172, 174, 175, 176, 177, 178, 179, 180, 181, 182, 183, 185, 187, 188, 189, 190, 191, 194, 200, 220, 230, 234, 250, 292, and 293 described herein may include software operative on one or more processors or processing threads to perform methods according to the teachings of various embodiments of the present invention.

One of ordinary skill in the art will understand, upon reading and comprehending this disclosure, the manner in which a software program can be launched from a computer readable medium in a computer-based system to execute the functions defined in the software program. One of ordinary skill in the art will further understand the various programming languages that may be employed to create one or more software programs designed to implement and perform the methods disclosed herein. The programs can be structured in an object-orientated format using an object-oriented language such as Java, Smalltalk, or C++. Alternatively, the programs can be structured in a procedure-orientated format using a procedural language, such as COBOL or C. The software components may communicate using any of a number of mechanisms that are well-known to those skilled in the art, such as application program interfaces (API) or interprocess communication techniques such as the Remote Procedure Call (RPC). However, as will be appreciated by one of ordinary skill in the art upon reading this disclosure, the teachings of various embodiments of the present invention are not limited to any particular programming language or environment, including Hypertext Markup Language (HTML) and Extensible Markup Language (XML).

Thus, as is evident from the preceding description, and referring back to FIGS. 1 and 2, it can be seen that during the operation of the apparatus 100, 200, a processor 295 may access some form of computer-readable media, such as the memory 234. Therefore, a system 292 according to an embodiment of the invention may include a processor 295 coupled to a memory 234, volatile (e.g., a random access memory (RAM), etc.) or nonvolatile (e.g., a flash memory, a disk drive, etc.), a memory controller 296, and ETA hardware 230. As noted above, the system 292 may also include an I/O interface 293, as well as the apparatus 100, 200.

By way of example and not limitation, computer-readable media 234 may comprise computer storage media and communications media. Computer storage media includes volatile and non-volatile, removable and non-removable media implemented in any method or technology for storage of information such as computer-readable instructions, data structures, program modules or other data. Communications media specifically embodies computer-readable instructions, data structures, program modules or other data in a modulated data signal such as a carrier wave, coded information signal, and/or other transport mechanism, which includes any information delivery media. The term "modulated data signal" means a signal that has one or more of its characteristics set or changed in such a manner as to encode information in the signal. By way of example and not limitation, communications media also includes wired media such as a wired network or direct-wired connections, and wireless media such as acoustic, optical, radio frequency, infrared and other wireless media. Combinations of any of the above are also included within the scope of computer-readable and/or accessible media. Thus, still referring to FIG. 2, it is now easily understood that another embodiment of the invention may include an article 292 comprising a machine-accessible medium 234 having associated data 297, wherein the data, when accessed, results in a machine performing activities such as receiving an application sockets call from an application program at an adaptation module, deriving a translated sockets call from the application sockets call, receiving the translated sockets call at a DTI having a set of memory structures, coupling the translated sockets call to a DTI accelerator using the set of memory structures, and coupling the set of memory structures to a TCP/IP accelerator.

Other activities may include maintaining a set of logically separate control and transfer flows for a plurality of DTIs using a context table included in a kernel agent buffer pool, as well as communicating over a default communication path between an operating system and the DTI accelerator using a raw packet driver. Another activity might include processing a subset of packets included in a plurality of packets not processed by the operating system or the TCP/IP accelerator using an exception agent.

Although specific embodiments have been illustrated and described herein, those of ordinary skill in the art will appreciate that any arrangement that is calculated to achieve the same purpose may be substituted for the specific embodiments shown. This disclosure is intended to cover any and all adaptations or variations of various embodiments of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the following Abstract is provided to comply with 37 C.F.R. §1.72(b) requiring an Abstract that will allow the reader to quickly ascertain the nature of the technical disclosure. It is submitted with the understanding that it will not be used to interpret or limit the scope or meaning of the claims.

In the foregoing Detailed Description of Embodiments of the Invention, various features are grouped together in single embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. An apparatus, comprising:
    an adaptation module;
    a plurality of direct transport interfaces (DTIs), wherein each one of the plurality of DTIs includes a set of memory structures, and wherein the adaptation module is capable of providing a translated sockets call associated with an application program to a selected one of the plurality of DTIs; and
    a DTI accelerator, wherein the set of memory structures included in the selected one of the plurality of DTIs is capable of coupling the translated sockets call to the DTI accelerator, and wherein the DTI accelerator is capable of coupling the set of memory structures included in the selected one of the plurality of DTIs to a Transport Control Protocol/Internet Protocol (TCP/IP) accelerator.

2. The apparatus of claim 1, wherein the application program is capable of communicating directly with the TCP/IP accelerator using the translated sockets call.

3. The apparatus of claim 1, wherein the DTI accelerator and the TCP/IP accelerator are capable of associating a client connection request associated with a client with a Master DTI context, completing a connection sequence with the client, and associating the client with a child DTI.

4. The apparatus of claim 1, wherein the DTI accelerator and the TCP/IP accelerator are capable of associating a doorbell with a DTI and transferring a TCP/IP packet from an application buffer.

5. The apparatus of claim 4, further comprising:
a zero-copy send data path capable of transferring send data directly from the application buffer to the TCP/IP protocol accelerator; and
a one-copy send data path capable of transferring the send data through a DTI send buffer to the TCP/IP protocol accelerator.

6. The apparatus of claim 1, wherein the DTI accelerator and the TCP/IP accelerator are capable of associating a TCP/IP packet with a child DTI and transferring the TCP/IP packet to an application buffer.

7. The apparatus of claim 6, further comprising:
a zero-copy receive data path capable of transferring receive data directly from the TCP/IP protocol accelerator to the application buffer; and
a one-copy receive data path capable of transferring the receive data through a DTI receive buffer to the application buffer.

8. The apparatus of claim 1, further comprising:
a DTI buffer pool managed by the adaptation module, wherein the buffer pool enables dynamic allocation of the set of memory structures included in each one of the plurality of DTIs.

9. The apparatus of claim 1, further comprising:
a kernel agent to initialize the DTI accelerator and the TCP/IP accelerator;
a set of control tables shared by the kernel agent, the DTI accelerator, and the TCP/IP accelerator;
a raw packet driver to provide a default communication path between the DTI accelerator and an operating system; and
an exception agent to process packets not processed by the TCP/IP accelerator or the operating system.

10. The apparatus of claim 9, further comprising:
an interrupt proxy to receive an interrupt associated with the adaptation module from the DTI accelerator, the interrupt proxy to relay the interrupt to the adaptation module to enable processing of the interrupt.

11. A system, comprising:
an apparatus including an adaptation module, a plurality of direct transport interfaces (DTIs), wherein each one of the plurality of DTIs includes a set of memory structures, and wherein the adaptation module is capable of providing a translated sockets call associated with an application program to a selected one of the plurality of DTIs, and a DTI accelerator, wherein the set of memory structures included in the selected one of the plurality of DTIs is capable of coupling the translated sockets call to the DTI accelerator, and wherein the DTI accelerator is capable of coupling the set of memory structures included in the selected one of the plurality of DTIs to a Transport Control Protocol/Internet Protocol (TCP/IP) accelerator; and
a general purpose input/output interconnect interface capable of being communicatively coupled to the apparatus.

12. The system of claim 11, further including:
a DTI buffer pool managed by the adaptation module, wherein the DTI buffer pool enables dynamic creation and destruction of each one of the plurality of DTIs.

13. The system of claim 11, further comprising:
a kernel agent to manage the DTI accelerator and the TCP/IP accelerator.

14. The system of claim 13, wherein the kernel agent includes an address translation table, a context hash table, a context table, a routing table, a set of kernel space queues, a plurality of interrupt event queues, and a kernel buffer pool.

15. A method comprising:
receiving an application sockets call from an application program at an adaptation module;
deriving a translated sockets call from the application sockets call;
receiving the translated sockets call at a direct transport interface (DTI) having a set of memory structures;
coupling the translated sockets call to a DTI accelerator using the set of memory structures; and
coupling the set of memory structures to a transport control protocol/internet protocol (TCP/IP) accelerator.

16. The method of claim 15, further comprising:
associating a send queue and a receive queue with the DTI to enable posting send and receive descriptors, respectively.

17. The method of claim 15, further comprising:
associating a doorbell address with the DTI to enable posting event notices from the adaptation module to the DTI accelerator.

18. The method of claim 15, further comprising:
associating an event queue with the DTI to enable posting event notices from the DTI accelerator to the adaptation module.

19. The method of claim 15, further comprising:
transferring send data directly from an application buffer associated with the application program to the TCP/IP accelerator.

20. The method of claim 15, further comprising:
transferring send data indirectly from an application buffer associated with the application program to the TCP/IP accelerator through a send buffer associated with the DTI.

21. The method of claim 15, further comprising:
transferring receive data directly from the TCP/IP accelerator to an application buffer associated with the application program.

22. The method of claim 15, further comprising:
transferring receive data indirectly through a receive buffer associated with the DTI to an application buffer associated with the application program.

23. The method of claim 22, further comprising:
temporarily storing a plurality of packets received out-of-order in the receive buffer associated with the DTI.

24. The method of claim 22, further comprising:
temporarily storing a plurality of packets received when no sockets receive call is pending in the receive buffer associated with the DTI.

25. The method of claim 15, further comprising:
managing the DTI accelerator and the TCP/IP accelerator using a kernel agent buffer pool.

26. The method of claim 25, further comprising:
translating a virtual address included in the translated sockets call into at least one physical address to access a memory structure included in a virtual memory space associated with the application program using a translation table included in the kernel agent buffer pool.

27. The method of claim 25, further comprising:
translating IP addresses and TCP port numbers received in a network packet into a pointer to a DTI context stored in a context table in the kernel agent buffer pool.

28. The method of claim 27, further comprising:
calculating a hashed value from the IP addresses and TCP port numbers received in a network packet and using the hashed value as an index into a context hash table in order to fetch from the context hash table a pointer into the context table stored in the kernel agent buffer pool.

29. The method of claim 25, further comprising:
translating a destination IP address of a packet being sent to a network into a local subnet address using a routing table stored in the kernel agent buffer pool.

30. A method comprising:
receiving a connection request from a client;
associating the connection request with a master DTI;
receiving a translated sockets call at the master DTI, wherein the translated sockets call is derived from an application sockets call;
acquiring a child DTI from the master DTI;
associating the child DTI with the connection request;
completing a connection sequence to provide an established connection associated with the connection request; and
notifying an ETA adaptation module of the established connection.

31. The method of claim 30, wherein associating the connection request with a master DTI further comprises:
calculating an index into a hash table.

32. The method of claim 30, wherein acquiring a child DTI from the master DTI further comprises:
acquiring the child DTI from the master DTI through a master DTI queue.

33. The method of claim 30, wherein associating the child DTI with the connection request further comprises:
calculating an index into a hash table.

34. The method of claim 30, further comprising:
sending a first connection acknowledgment to the client; and
waiting for a second connection acknowledgment from the client.

35. The method of claim 30, further comprising:
writing a connection ready notification to a master DTI event queue.

36. An article comprising a computer storage medium storing associated data, wherein the data, when accessed, results in a computer performing:
receiving an application sockets call from an application program at an adaptation module;
deriving a translated sockets call from the application sockets call;
receiving the translated sockets call at a direct transport interface (DTI) having a set of memory structures;
coupling the translated sockets call to a DTI accelerator using the set of memory structures; and
coupling the set of memory structures to a transport control protocol/internet protocol (TCP/IP) accelerator.

37. The article of claim 36, wherein the machine-accessible medium further includes data, which when accessed by the machine, results in the machine performing:
maintaining a set of logically separate control and transfer flows for a plurality of DTIs including the DTI using a context table included in a kernel agent buffer pool.

38. The article of claim 36, wherein the machine-accessible medium further includes data, which when accessed by the machine, results in the machine performing:
communicating over a default communication path between the operating system and the DTI accelerator using a raw packet driver.

39. The article of claim 36, wherein the machine-accessible medium further includes data, which when accessed by the machine, results in the machine performing:
processing a subset of packets included in a plurality of packets not processed by the operating system or the TCP/IP accelerator using an exception agent.

* * * * *